United States Patent Office 3,336,292
Patented Aug. 15, 1967

3,336,292
QUATERNARY AMMONIUM STARCH ETHERS
AND PROCESS OF PREPARATION
Kenneth W. Kirby, Cedar Rapids, Iowa, assignor to Penick & Ford, Ltd., Incorporated, Cedar Rapids, Iowa, a corporation of Delaware
No Drawing. Filed Sept. 18, 1963, Ser. No. 309,850
5 Claims. (Cl. 260—233.3)

This invention relates to quaternary ammonium starch ethers and to a process of preparing such products. More particularly, the invention is concerned with the manufacture of quaternary ammonium starch ethers which are especially adapted for use in sizing cellulosic fibers, such as paper pulp, cotton textiles, etc.

Compounds coming within the general class of quaternary ammonium starch ethers are known, and their utility as paper sizes and in other related applications, has been recognized. Compounds of this general type and their application for sizing purposes are described in Patents 2,876,217 and 3,017,294. The compounds described in these patents are formed by the reaction of an epoxide etherifying agent with starch, which etherifying agent has been formed by the reaction of an epihalohydrin with a tertiary amine or tetiary amine salt. The resulting products are 2-hydroxypropylene quaternary ammonium starch ethers. The hydroxyl substituent on the ether side chains is believed to be desirable in rendering the starch derivatives more hydrophilic, and thereby compensating for the elimination of the hydroxyl group in forming the ether side chain. For use as paper sizes and in related applications, it would not be desirable to have starch derivatives which are substantially more hydrophobic than the original starch derivatives, as may be obtained where the ether substituent groups impart hydrophobic properties, such as where they contain relatively long hydrocarbon chains.

The only known commercial process heretofore used for the preparation of quaternary ammonium starch derivatives involves the reaction of trimethylamine with epichlorohydrin to form the epoxide etherifying agent. Since epichlorohydrin is a cross-linking agent for starch, any excess or residual epichlorohydrin must be completely removed from the epoxide etherifying agent before the starch is etherified. Even minute traces of epichlorohydrin will produce sufficient cross-linking to inhibit gelatinization, and thereby interfere with the utilization of the starch product. The necessity for completely removing the epichlorohydrin appreciably increases the cost of the etherifying agent, and requires extremely careful control of the overall process to guard against a deleterious carryover of the epichlorohydrin into the etherification process. Consequently, it has been desired to provide an improved process for preparing quaternary ammonium starch derivatives, which have comparable or superior properties to the 2-hydroxypropylene quaternary ammonium derivatives for application as paper sizes and in the treatment of other cellulosic fibers.

One possibility which has been given some consideration is to first form a tertiary amine starch derivative, and then quaternize the tertiary amine groups. For example, starch can be reacted with b-diethyl amino ethylchloride hydrochloride to form an ethylene tertiary amino starch ether, which can then be quaternized with a reagent such as methyl iodide, thereby obtaining an ethylene quaternary ammonium starch ether in which the quaternary group is methyldiethylammonium iodide. Because of the very short hydrocarbon chain (ethylene), this compound has desirable hydrophilic properties, while the quaternary ammonium group imparts the desired "cationic" properties. Here again, however, the procedure has serious disadvantages from the standpoint of the expense of the reagents, the number of processing steps involved, and thereby the overall cost of the operation is made excessive.

Other alternatives have proven equally disappointing. For example, it might be assumed that quaternary ammonium starch ethers could be prepared by direct etherification employing a mono-halogen etherifying agent containing a quaternary ammonium group. However, attempts to etherify starch with compounds such as chloromethoxymethylene trimethylammonium chloride and chloroethyl trimethylammonium bromide have not been successful. The failure of such attempts is believed to be due to the relatively low order of reactivity of mono-halogen-substituted organic etherifying agents, as compared with epoxide etherifying agents, and it is also believed that the problem also involves steric hindrance. The substitution must be carried to the point where the properties of the starch are substantially modified without at the same time disrupting the granule structure of the starch and rendering it unfilterable. As is well known in the art, starch derivatives prepared in water suspensions should be kept in the granule form to permit their washing on filters to remove salts, and also to permit the ready recovery of the products in dry form, which can then be gelatinized or "pasted" immediately prior to application.

It is, therefore, a principal object of the present invention to provide a simpler and less expensive method for preparing quaternary ammonium starch ethers, while at the same time obtaining products which are especially adapted for use in the sizing of cellulosic fibers. More specifically, it is an object to provide a new class of quaternary ammonium starch ethers which can be prepared efficiently from readily available, inexpensive reagents, and which derivatives are not objectionably hydrophobic when employed as paper sizes or in the treatment of other cellulosic fibers. Further objects and advantages will be indicated in the following detailed specification.

This invention is applicable generally to unswollen, granule starches, and therefore the term "starch" as used herein includes the varieties of starch and commonly manufactured modifications thereof which are produced in the filterable granule form. The granule structure of starch persists even during such modification treatments as acid-conversion to thin-boiling types of starch and hypochlorite oxidation. The product of the invention may be roll or drum-dried to provide an instantly cold water-soluble form of the derivative. Such commercially available granule starches include potato, tapioca, rice, sorghum, the starch fractions amylose and amylopectin, and various modifications thereof, such as hydroxyethyl starches, etc.

In accordance with the present invention, an etherifying agent containing a qaternary ammonium group is reacted with an aqueous suspension of granule starch under nongelatinizing conditions of alkalinity and temperature. For example, the aqueous suspension which forms the reaction medium preferably has a starch concentration ranging from 30 to 45% by weight on a dry starch basis. The preferred reaction temperatures will usually range from 30° to 55° C., while the preferred amount of alkali, such as sodium hydroxide, will usually range from .04 to .16 mole per $C_6H_{10}O_5$ mole of starch. Excess alkali is preferably present to at least 20% excess to cause the reaction to be efficient, since alkali is consumed during the reaction. It will also be understood that enough alkali should be present to use up all the reagent for maximum reagent economy. Where excess alkali is present, as preferred, a salt gelatinization inhibitor can be included to assure that the required alkalinity and temperature conditions for the etherification reaction do not result in any substantial degree of gelatinization of the starch. For example, sodium chloride can be used as a gelatinization inhibitor, or other soluble alkali metal chloride, carbonate, acetate, nitrate, or sulfate. For some reaction conditions, it may be unnecessary to employ a salt gelatinization inhibitor. Since such etherification procedures and techniques are well known in the art, it is not believed it will be necessary to further describe them herein.

The process improvement of the present invention is characterized particularly by the use as the etherifying agent of a compound represented by the type formula (1) 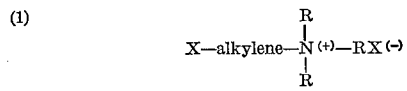

wherein X is halogen, preferably bromine or chlorine, R is an alkyl or hydroxyalkyl group containing up to two carbon atoms such as methyl, ethyl, or hydroxyethyl, and wherein the alkylene group contains solely carbon and hydrogen, and at least three but not over five carbons. For example, the alkylene group may be propylene, butylene, pentylene, or for some purposes the alkylene group may be unsaturated, such as a butenyl group. Examples of specific etherifying agents coming within the scope of the present invention are: 3 chloro or bromo propyl trimethyl-ammonium bromide or chloride, 4 bromo or chloro butyltrimethylammonium bromide or chloride, 5 bromo or chloro pentyltrimethylammonium bromide or chloride, and the corresponding compounds where one or more of the methyl groups attached to the ammonium nitrogen are substituted by ethyl groups, such as the ethyldimethyl ammonium compounds, the methyldiethylammonium compounds, and the triethylammonium compounds. For the purpose of minimizing steric hindrance, especially with compounds wherein the alkylene group contains only three carbon atoms, the trimethylammonium compounds are preferred. As indicated, the ammonium nitrogen should be in the salt form, preferably as the chloride or bromide. Since the etherifying agents of this invention are conveniently prepared by reacting trimethylamine with dihalo-substituted alkylene compounds, such as 1,3-dichloropropane, 1,4-dibromobutane, 1-bromo-3-chloropropane, preferred compounds are those in which the quaternary ammonium group is the trimethyl bromide or chloride. A preferred subclass of etherifying agents for use in practicing the present invention are represented by the structural formula (2) 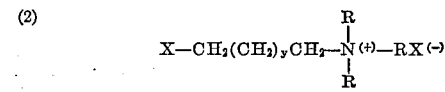

wherein X is bromine or chlorine, R is an alkyl group containing not over two carbon atoms and preferably is methyl, and $y$ is a number from one to three.

As will be noted, it has been specified that the alkylene groups of the etherifying agent (which extend between the ammonium nitrogen and the halogen which is removed during the etherification reaction) should contain at least three but not over five carbon atoms. This limitation is of considerable importance for achieving the objects and benefits of the present invention. If the alkylene group contains less than three carbon atoms, such as a methyl or ethyl group, it is difficult if not impossible to carry out the etherification reaction. The substitution of the starch cannot be carried to a point where the properties of the starch are substantially modified by the introduction of the ammonium nitrogen groups, while at the same time maintaining the starch in filterable, granule form. Apparently the ammonium nitrogen with the alkyl groups attached thereto provide a problem of steric hindrance, which tends to block the desired etherification reaction where the alkylene chain is shorter than three carbon atoms. By limiting the alkylene chain to the range of from three to five carbon atoms, ether derivatives can be produced which have the desired basic or "cationic" properties for use in sizing cellulose fibers, and which are adequately hydrophilic for such applications, notwithstanding the introduction of an essentially hydrophobic alkylene group. Where the alkylene group contains more than five carbon atoms, the utility of the products for sizing paper pulp or other cellulosic fibers is impaired, and this is apparently due to the fact that the compounds are less hydrophilic than is desirable for such applications. For similar reasons, it is preferred that the alkyl groups attached to the ammonium nitrogen be limited to not over two carbon atoms.

As will be understood by those skilled in the art, the quantity of etherifying agent to be employed will vary with the efficiency of the reaction. Reaction efficiencies of 40 to 50% are usually considered satisfactory for etherification reactions, but much higher reaction efficiencies can be obtained by the method of this invention, up to efficiencies ranging from at least 70 to 85%. Preferably a sufficient quantity of the etherifying agent is employed to achieve a substitution of .01 to 0.1 ether group per anhydroglucose unit. For most uses in treating cellulosic fibers, a substitution of about .02 to .05 ether group per anhydroglucose unit is sufficient. Consequently, the etherifying reagent may be employed in proportions of .02 to 0.2 mole per $C_6H_{10}O_5$ mole of starch, or preferably from about .03 to .09 mole of etherifying agent per $C_6H_{10}O_5$ mole of starch. It will be understood that the course of the etherification reaction can be followed by standard analytical procedures, and that where the desired degree of etherification has not been obtained, more of the etherifying agent can be added and the reaction continued. In commercial production, the reaction conditions and reagent proportions will be standardized to achieve the desired degree of substitution.

The starch products produced by the method of the present invention can be represented generally as follows:

(3) 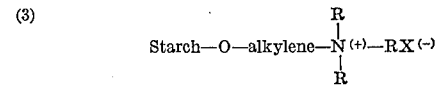

wherein the "starch" is in the filterable granule form, and contains from .01 to 0.1 ether group per anhydroglucose unit, and wherein the alkylene, R, and X have the meanings previously set out in connection with Formula 1 above. The preferred subclass of compounds produced in accordance with the present invention can be represented by the structural formula (4) 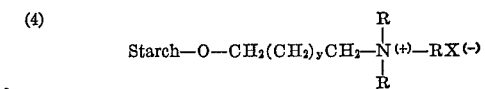

wherein the "starch" is in the filterable granule form, and preferably contains about .02 to .05 ether group per anhydroglucose unit, and wherein $y$, R, and X have the meanings previously described in connection with Formula 2.

The process and products of the present invention and the utility thereof are further illustrated by the following specific examples.

*Example 1*

The starch derivative, starch

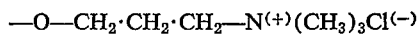

may be prepared in the following manner:

Prepare an aqueous slurry of commercial starch and determine the solids concentration with a Baumé spindle. Dissolve caustic soda in water to yield a 30% by weight concentration and then prepare an aqueous sodium chloride solution to yield 26% by weight. Mix the salt and caustic solutions thoroughly in such a proportion that when added to the starch slurry you will have added 1.5% caustic soda based on the starch solids and 4% salt based on the water. Add the salt-caustic solution carefully while stirring the starch slurry to avoid local gelatinization of the starch. Heat the whole mixture with stirring to about 110–115° F. and add a weighed portion of 3-chloropropyl trimethyl ammonium chloride reagent (prepared by quaternizing 1,3 dichloropropane) such that on a molar basis it is about 80% or less of the molar amount of caustic soda added earlier in the procedure. Other reagent levels may be used by adjusting the salt-caustic concentration, keeping in mind that gelatinization should be avoided and that a slight excess of caustic is usually required to promote an efficient reaction. The reaction may be followed by titrating aliquot portions of the reaction mixture with standard acid to a phenolphthalein end point. A completed reaction is indicated by a uniform, nonchanging titration value. At the end of the reaction, the starch product is recovered after first adjusting the slurry to approximately neutral pH with acid, then filtering and resuspending in water to remove the salts added and formed during reaction. Dry the product to an equilibrium moisture, thereby obtaining the starch ether derivative of propylene trimethyl ammonium chloride as a dry product in the native granule form.

*Example 2*

Following the same general procedure as Example 1, a mixture is prepared by suspending 300 grams of unmodified granule starch in 470 grams of water and adding 30 grams of 30% sodium hydroxide solution, 145 grams of 26% sodium chloride solution and 15 grams of 3-chloropropyl trimethyl ammonium bromide. Reaction is continued at 120° F. until the titration values indicate the reaction has ceased. The starch product, being the granule starch ether of propylene trimethyl ammonium bromide, is recovered as described in Example 1 and dried. Nitrogen analysis of the product was .13% indicating an approximate degree of substitution of 0.015 for each mole of anhydroglucose.

*Example 3*

A mixture is prepared by suspending 300 grams of unmodified granule starch in 470 grams of water and adding 30 grams of 30% sodium hydroxide solution, 145 grams of 26% sodium chloride solution and 15 grams of 4-bromobutyl trimethyl ammonium bromide in the manner described in Example 1. Reaction is continued at 125° F. until the titration values indicate the reaction has ceased. The starch product, being the granule starch ether of butylene trimethyl ammonium bromide, is recovered as described in Example 1 and dried. Nitrogen analysis of the product was 0.13% indicating a degree of substitution of 0.023 for each anhydroglucose unit.

*Example 4*

A mixture is prepared by suspending 300 grams of starch in 430 grams of water and adding 15 grams of 30% sodium hydroxide solution, 66 grams of 26% sodium chloride solution and 15 grams of 5-bromopentyl trimethyl ammonium bromide in the manner described in Example 1. Reaction is continued at 115° F. until the titration values indicate the reaction has ceased. The starch product, being the granule starch ether of pentylene trimethyl ammonium bromide, is recovered as in Example 1 and the product dried. Nitrogen analysis was 0.13% indicating a degree of substitution of 0.023 for each anhydroglucose unit.

*Example 5*

A mixture is prepared by suspending 500 grams of unmodified granule starch in 800 grams of water and adding 20.5 grams of 30% sodium hydroxide solution, 123 grams of 26% sodium chloride solution and 25 grams of 4-chloro-2,3-butenyl trimethyl ammonium chloride in the manner described in Example 1. Reaction is continued at 120° F. until the titration values indicate the reaction has ceased. The starch product, being the granule starch ether of butenyl trimethyl ammonium chloride, is recovered as described in Example 1 and dried. Nitrogen analysis of the product was 0.185% indicating a degree of substitution of 0.033 for each anhydroglucose unit.

*Example 6*

The utility of products produced as described in the foregoing examples is shown by examining the effect on the physical properties of a cellulosic material treated with small quantities of the starch derivative. A cellulose fiber composition consisting of sulfite pulp which is 50% poplar and 50% spruce with a Williams freeness of 44 and containing 10% clay was prepared and adjusted to pH 4.5 using alum in one case and to neutral pH in another case. TAPPI mullen and percent ash were determined in the alum sheet while mullen only was tested in the neutral sheet since clay was eliminated from the preparation. The data shown in Table I indicate that a low amount of starch effects a marked increase in the strength of the sheet, and ash retention is generally increased. Percent starch used is based on the dry weight of the cellulosic fiber.

| Starch Derivative | Tappi mullen | | Ash, percent Alum system |
|---|---|---|---|
| | Alum system | Neutral system | |
| Control—unmodified starch | 8.6 | 7.3 | 6.0 |
| .75% Propylene trimethylammonium bromide starch ether | 11.1 | 8.8 | 6.6 |
| .75% Butylene trimethylammonium bromide starch ether | 11.3 | 9.3 | 6.1 |
| .75% Pentylene trimethylammonium bromide starch ether | 10.9 | | 6.1 |

While in the foregoing specification this invention has been described in relation to certain specific embodiments thereof and many details have been set forth for purpose of illustration, it will be apparent to those skilled in the art that the invention is susceptible to other embodiments than those specifically set forth herein, and that certain of the details can be varied considerably without departing from the basic principle of the invention.

I claim:

1. The process for the manufacture of quaternary ammonium starch ethers, wherein an etherifying agent containing a quaternary ammonium group is reacted with a suspension of granule starch under nongelatinizing conditions of alkalinity and temperature, comprising employing as said etherifying agent a compound represented by the structural formula

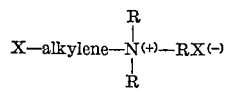

wherein X is selected from bromine and chlorine, R is selected from methyl and ethyl, and said alkylene is a straight chain hydrocarbon group containing at least 3 but not over 5 carbons.

2. The process of claim 1 wherein the alkyl group represented by said R is methyl, and wherein said alkylene contains from 3 to 4 carbons.

3. The process for the manufacture of quaternary ammonium starch ethers, comprising reacting a haloalkylene quaternary having an alkylene group of selected chain length with an aqueous alkaline suspension of granule starch, said quaternary being reacted with said starch under non-gelatinizing conditions of alkalinity and temperature in the proportions of .02 to 0.2 mole per mole of starch, said reaction being continued until said starch contains from .01 to 0.1 quaternary ether group per anhydroglucose unit, said haloalkylene quaternary being represented by the structural formula

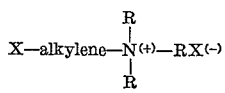

wherein said alkylene is a straight chain hydrocarbon group containing at least 3 but not over 5 carbons, R is an alkyl group containing from 1 to 2 carbon atoms, and X is selected from bromine and chlorine.

4. The process of claim 3 wherein said quaternary is reacted in the proportions of from .03 to .09 mole per mole of starch, and wherein said reaction is continued until said starch contains from .02 to .05 ether group per anhydroglucose unit.

5. The process of claim 3 wherein the alkyl group represented by said R is methyl, and wherein said alkylene contains from 3 to 4 carbons.

References Cited

UNITED STATES PATENTS

| | | | |
|---|---|---|---|
| 2,813,093 | 11/1957 | Caldwell et al. | 260—233.3 |
| 2,876,217 | 3/1959 | Paschall | 260—233.3 |
| 3,017,294 | 1/1962 | Meisel | 117—139.5 |

DONALD E. CZAJA, *Primary Examiner.*

R. W. MULCAHY, *Assistant Examiner.*